Oct. 27, 1953    J. G. LINDEMAN    2,656,893
OVERLOAD BRAKE MEANS FOR VEHICLES
Filed Dec. 29, 1949    2 Sheets-Sheet 1
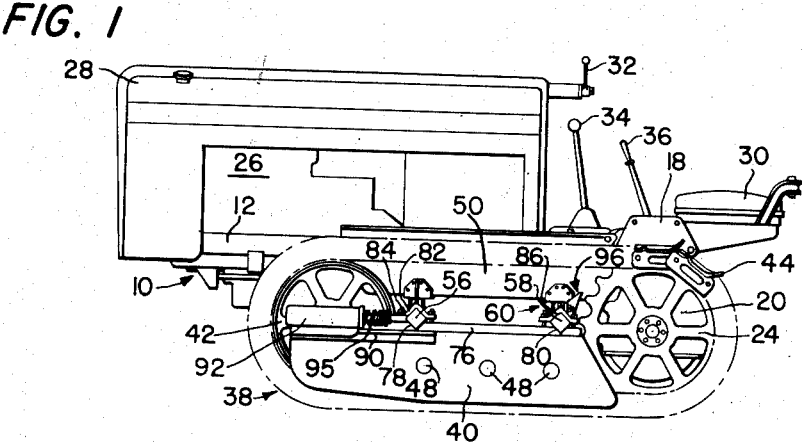
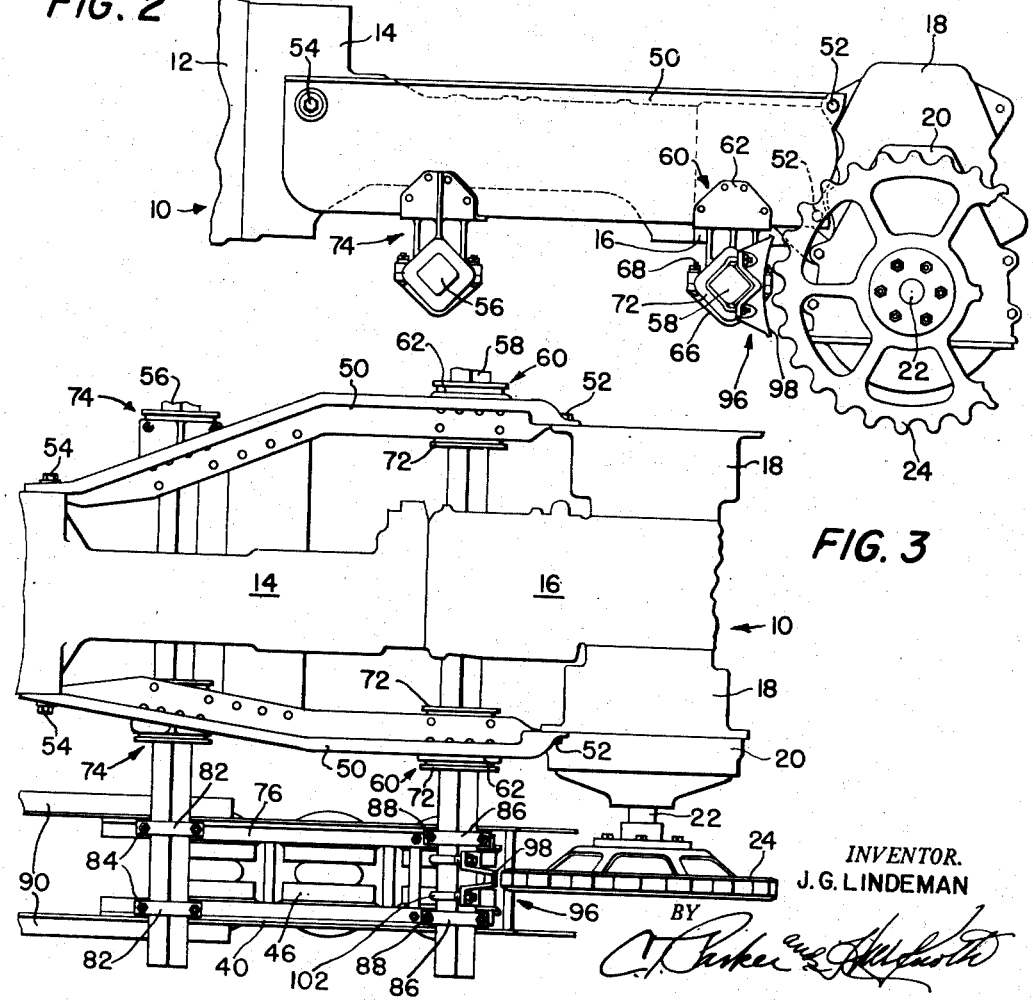
INVENTOR.
J. G. LINDEMAN
BY
ATTORNEYS Oct. 27, 1953  J. G. LINDEMAN  2,656,893
OVERLOAD BRAKE MEANS FOR VEHICLES
Filed Dec. 29, 1949  2 Sheets-Sheet 2
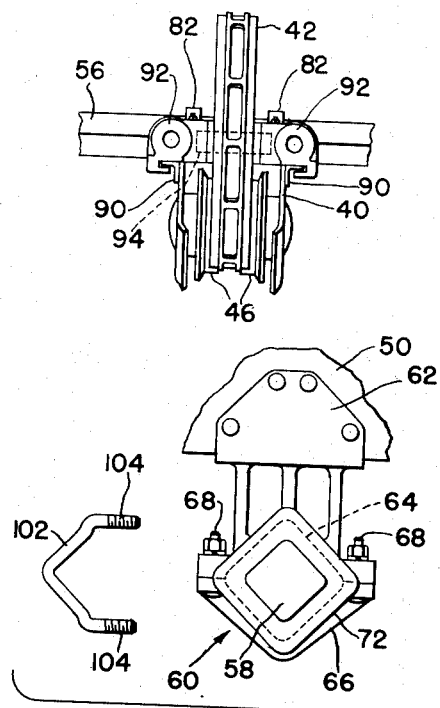
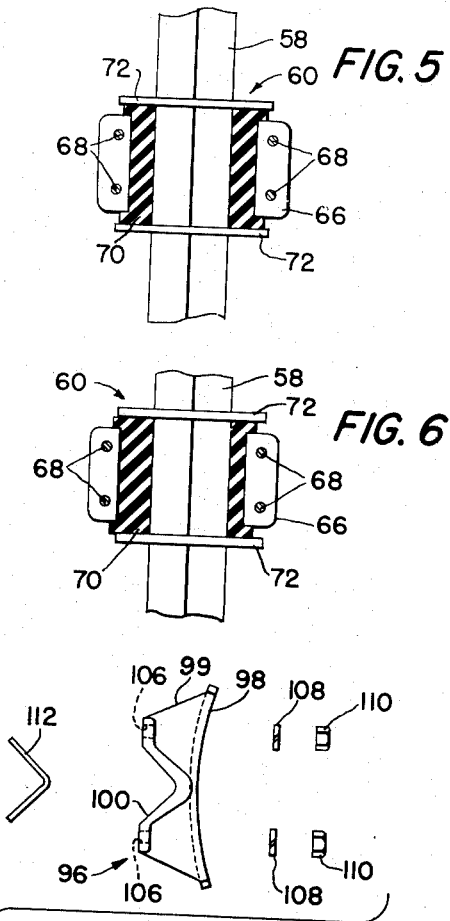
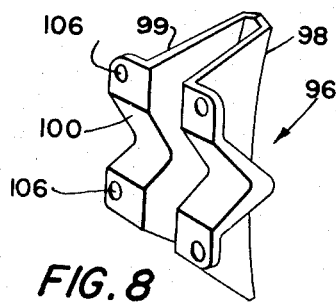
INVENTOR.
J. G. LINDEMAN
ATTORNEYS Patented Oct. 27, 1953

2,656,893

UNITED STATES PATENT OFFICE 2,656,893

OVERLOAD BRAKE MEANS FOR VEHICLES

Jesse G. Lindeman, Yakima, Wash., assignor to Deere & Company, Moline, Ill., a corporation of Illinois Application December 29, 1949, Serial No. 135,607

16 Claims. (Cl. 180—9.1)

This invention relates to vehicle brake means and more particularly to brake means operative in response to overload conditions encountered by the vehicle.

The embodiment of the invention disclosed herein is primarily designed for use in a tractor of the track-laying type comprising a longitudinal body carried between opposite track frames including a longitudinal track chain trained about a front idler wheel and a rear sprocket. Means on each track frame yieldably urges the idler wheel forwardly to maintain a predetermined tension on the chain. Because of the conditions under which tractors of this type operate, the track means run fairly constantly in loose dirt and rock and other fragmentary material that is likely to and does get into the track chain and often becomes wedged between the track chain and sprocket or idler, with the result that the idler wheel is forced rearwardly against its resilient or tensioning means. Normally the resilient means comprises one or more relatively strong compression springs. When the track becomes overloaded to an extent sufficient to cause complete compression or solidity of the springs, there is no longer any yieldability in the track means, and forces taken by the track means are then transmitted in the form of shock loading directly to the tractor.

In one type of tractor of the track-laying type, the track frames are mounted on the body by means including secondary resilient mountings. When the track means become loaded as stated above, the resilient mountings yield to permit the track frame to shift rearwardly toward the driving sprocket, which is journaled on a fixed axis on the tractor body. In the particular type of tractor referred to, and in many conventional designs of tractor, the final drive mechanism for the drive sprockets includes depending gear housings which are mainly castings of sufficient strength to accept normal loading. However, in view of the shock loading resulting from overloading of the track means, these castings are often broken and require replacement.

According to the present invention, the tractor is provided with means for impeding the forward progress of the tractor incident to overloading of the track means under conditions like those described above. Primarily, the invention includes brake means shiftably mounted on the tractor and normally carried in a released position free from the drive sprocket, or other equivalent rotatable part, and movable to a sprocket-engaging position in response to shifting of the track frames incident to overloading. It is a further object of the invention to provide a brake means in the form of a shoe especially adapted for attachment to tractors of existing types, particularly those in which the track frames are mounted on the body by resilient means capable of allowing relative longitudinal movement between the track frames and the body. A further object of the invention is to provide means for adjustably mounting the brake shoe or equivalent means so that its effectiveness can be delayed or advanced in accordance with the extent to which it is desired to allow the track frames to shift relative to the tractor body.

The foregoing and other important objects and desirable features inherent in and encompassed by the combinations and sub-combinations of the invention will become apparent as a complete disclosure is made of a preferred form of the invention in the following detailed description and accompanying sheets of drawings, in which Figure 1 is a side elevational view of one form of tractor equipped with brake means according to the invention;

Figure 2 is an enlarged fragmentary view of one side of the tractor, showing a portion of the body, means for mounting the track frames on the body and the relationship of the brake means to the drive sprocket;

Figure 3 is a plan view, with portions of the tractor broken away, of the structure shown in Figure 2;

Figure 4 is a front view of the mounting of the front idler;

Figure 5 is a sectional view of one of the means for mounting the track frame on the body, showing the resilient means (rubber) in normal or uncompressed condition;

Figure 6 is a view similar to that shown in Figure 5 but showing compression of the rubber at one side of the mountings as when the track frame shifts rearwardly relative to the tractor body;

Figure 7 is an exploded view showing the components of the brake or retarding means and the mounting means therefor;

Figure 8 is a perspective view of the brake shoe per se; and

Figure 9 is a perspective view of the brake shoe mounting shim per se.

The tractor chosen for the purposes of illustration comprises a longitudinally extending body or frame part 10 having a forward portion 12, an intermediate portion 14, and a rear portion 16. The rear portion 16 comprises a transmission casing and has at each side thereof a depending housing in the form of a casting 18 to which is secured in complementary relationship a cast secondary housing part or cover 20. Since both sides of the tractor are symmetrically constructed, only one side has been shown and will be described.

The depending housing structure 18—20 contains appropriate drive gearing (not shown) for driving a rotatable output shaft 22 on which is fixed a rotatable member in the form of a drive sprocket or wheel 24, it being understood that there are a pair of such sprockets, one at each side of the body 10.

The forward portion 12 of the body comprises supporting means for an internal combustion engine 26 and the intermediate portion 14 of the body provides a rigid connection between the engine-supporting portion 12 and the transmission casing 16, this intermediate portion accommodating the usual engine clutch and propeller shaft (neither of which is shown). The body portions 12 and 14 serve also to mount a generally conventional radiator grille and hood structure 28 disposed ahead of an operator's seat 30 carried on the transmission casing 16. The rear portion of the grille and hood structure carries a control member 32, and other control members 34 and 36 are mounted on the body ahead of the operator's seat 30, the construction just described being quite typical of tractors of this type.

The body 10 is carried between a pair of longitudinally extending track means, only one of which is illustrated and designated generally by the numeral 38. The track means includes a longitudinally extending track frame 40 extending horizontally ahead of the drive sprocket 24 and carrying at its forward end a rotatable member in the form of a front idler wheel 42. An endless track chain or belt 44 is trained about the sprocket 24 and idler wheel 42. The track frame includes a plurality of track rollers, as is conventional, for supporting the track frame and tractor on the lower run of the track chain 44. The track rollers appear at 46 in Figures 3 and 4 and the mountings therefor appear at 48 in Figure 1.

The track means in the tractor illustrated here are connected in load-supporting relationship to the body 10 by means of a suspension frame comprising a pair of longitudinally running, laterally spaced-apart frame members 50, best shown in Figures 2 and 3. Each member 50 is rigidly secured at its rear end by bolts 52 to the proximate depending housing structure 18—20 and is rigidly secured at its forward end by a single mounting cap screw 54 to a forward portion of the intermediate body portion 14. Because of the nature of the members 50 in completing the rigidity or general strength of the tractor body 10, these members, in effect, become part of the tractor body. Yet, the members also are part of the suspension means for carrying the tractor on the track frame 40 and may be just as readily spoken of as parts of the track frame.

The suspension means including the members 50 further has a front transverse member or bar 56 and a rear transverse member or bar 58. These bars are sufficiently long to extend completely across the tractor in out-rigger fashion over the track frame, the outermost or end portions of the front and rear bars resting respectively on front and rear upper portions of the longitudinal track frame 40. Each of the rear portions of the longitudinal members 50 has a depending bracket structure 60 for connection of the members 50 to the transverse bar 58. The details of this bracket will best be seen in Figures 2, 5, 6 and 7. The bracket 60 includes a rigid member 62 fixed to the member 50 and having a lower portion 64 shaped to conform loosely to the section of the transverse bar 58. A cap 66 complements the portion 64 of the bracket member 62, and the two are secured together by two pairs of bolts 68 (Figures 2 and 7).

The complementary members 64 and 66 surround a rubber cushion 70 which in turn surrounds that portion of the transverse bar 58 that passes through the bracket 60. The bar 58 is thus resiliently mounted on the members 50 and, because of compressibility of the rubber cushion 70, may have longitudinal shifting relative to the tractor body 10. The rubber cushion is confined between a pair of washers 72 fixed in axially spaced relation on the bar 58, one at either side of the cushion (Figures 5 and 6). A rearward position of the bar 58 relative to the bracket means 60 incident to compression of the rubber cushion 70 is illustrated in Figure 6. The normal or unloaded positions of the parts are shown in Figure 5.

The front bar 56 is mounted in brackets 74 similar in construction and detail to the brackets 60. Since the weight of the tractor body and its components is carried on the track means through the medium of the bars 56 and 58 and the mounting means or brackets 60 and 74, the track means may have limited shifting relative to the tractor body because of the rubber at 70 in the rear brackets and the rubber (not disclosed in detail) in the front brackets 74.

As previously stated, each bar 56, 58 has its outer end portion resting on the proximate track frame 40 (Figure 3). For the purpose of receiving the end portions of the bars 56 and 58, the track frame 40 carries an upper longitudinal member 76 shaped respectively at 78 and 80 to partially embrace the bars 56 and 58 (Figure 1). A pair of caps 82 complements the forward portion 78 of the member 76 and is secured thereto by a plurality of bolts 84 to mount the member 56 rigidly on the forward portion of the track frame 40. A similar pair of caps 86 and bolts 88 serve to rigidly mount the rear bar 58 on the track frame 40.

The front idler wheel 42 is mounted on the forward part of the track frame 40 by means of a pair of longitudinal slides 90 (Figures 1 and 4) so that the idler may have movement longitudinally toward and away from the sprocket 24. Each slide 90 carries a casting 92 transversely between which is carried a short shaft 94 about the axis of which the idler 42 is rotatable (Figure 4). Resilient means is provided for urging the idler 42 constantly forwardly to a normal position spaced a predetermined maximum distance from the sprocket 24. This resilient means includes a pair of longitudinal compression springs 95 (only one of which is shown) acting between the idler mount and the front end portion of the front transverse bar 56 (Figure 1).

From the description thus far it will be seen that the entire track structure, including the track means 38 and the transverse mounting bars 56 and 58, may yield rearwardly relative to the tractor body 10 and relative to the sprockets 24, because of the rubber mountings in the mounting means or brackets 60 and 74. Further, the front idler or wheel means 42 may move rearwardly toward the sprocket 24, being biased forwardly to a normal position by the resilient means including the compression springs 95. It will follow then that any jamming of the track chain 44, such as would be occasioned by the lodging of a rock or similar object between the chain and front idler wheel 42, would cause the idler wheel 42 to shift rearwardly against its resilient means or springs 95. It will be apparent that, if the rock or other object is of sufficient size, the rearward yielding of the wheel 42 could be sufficient to compress the springs 95 until they are solid. Thereafter, any loading on the track means would be transmitted with greater effect to the rubber mountings at 60 and 74, until maximum compression of the rubber mountings substantially rigidifies the connection between the bars 56 and 58 and frame 50, whereupon the frame 50 is urged directly rearwardly with force of considerable magnitude and acts through the bolts 52 directly on the rear depending housing structure 18—20. If the loading is sufficiently severe, the result may be breakage of the cast structure 18—20 or shearing of the bolts 52, either of which constitutes a major breakdown.

According to the present invention, the danger of breakage of any of the parts mentioned is eliminated by the provision of means responsive to overload of a predetermined magnitude for retarding or impeding forward progress of the tractor. Considering the track means broadly as wheel means, the progress-impeding means operates responsive to abnormal conditions encountered by the wheel means to vary the effectiveness of the driving means of the tractor to carry the tractor forwardly.

In the embodiment shown here, the progress-impeding means comprises a brake or retarding device designated generally by the numeral 96. This device is positioned just forwardly of or otherwise closely adjacent to the rotatable drive part or sprocket 24. Specifically, the device 96 includes a brake shoe or sprocket-engaging portion 98 and a bracket or mounting portion 99. This mounting portion is preferably shaped as at 100 to conform to the rear half of the proximate end of the transverse bar 58. The device further includes means complementary to the mounting portion for mounting the device on the track frame through the medium of the transverse bar 58. This mounting means includes a pair of U-bolts 102, each of which embraces the forward portion of the transverse bar 58 and has a pair of threaded portions 104 for passing through apertures 106 in the mounting portion 99 of the brake device 96 and for receiving washers 108 and nuts 110 (Figure 7). A shim 112 shaped as shown in Figures 7 and 9 is interposed between the mounting portion 100 and the rear portion of the bar 58. The shim may be added or omitted as desired to provide means for the adjustable mounting of the device 96 on the track frame.

Since the brake or retarding device 96 is carried directly by the track frame part, it is, in effect, carried by the tractor for movement between a normal position in which it is free of the sprocket (Figures 1, 2 and 3) to a braking or sprocket-engaging position (not shown) incident to rearward shifting of the track frame as a whole relative to the tractor body, the snug fit at 100 enabling the device to receive force directly from the track frame. Hence, as the track frame shifts rearwardly because of an overloaded or clogged condition of the track means, the brake shoe portion 98 will engage the sprocket and retard the progress of the tractor so that the tractor may be stopped before the forces applied to the track frame and applied to the depending structure 18—20 attain such magnitude as to cause damage to the structure.

The brake device in itself is of simple design and construction and may be readily furnished as an attachment or auxiliary item for a tractor of the type disclosed. Further, the brake device may be slightly modified within the teachings of the present invention for application to tractors and other vehicles of varying types. Another feature of the invention is the combination in which the retarding device may be built in as part of the vehicle structure. Other features and advantages of the invention not specifically enumerated will undoubtedly occur to those versed in the art, as likewise will numerous modifications and alterations in the preferred structure illustrated, all of which may be made without departing from the spirit and scope of the invention as defined in the appended claims.

What is claimed is:

1. For use in a tractor of the track-laying type having a longitudinal body part, a drive sprocket journaled at one side of the body part, a track frame part alongside the body part and ahead of the sprocket, an idler wheel spaced ahead of the sprocket and carried by the track frame part for rearward yielding relative to the track frame part and sprocket, an endless track chain trained about the sprocket and idler wheel, and means mounting the track frame part on the body part providing for rearward shifting of the track frame part relative to the body part and sprocket in response to forces of predetermined magnitude: a progress-impeding device having a drive-sprocket-engaging portion, and also having a mounting portion for mounting the device on one of the aforesaid parts for movement relative to the body part from a normal position free of the sprocket to a position in which said sprocket-engaging portion engages the sprocket; and said device having means thereon for receiving force from the track frame part for moving the device to sprocket-engaging position incident to a predetermined extent of rearward movement of the track frame part relative to the body part.

2. The invention defined in claim 1, further characterized in that: said device includes adjustable means for varying the range of movement of the device from normal position to sprocket-engaging position.

3. The invention defined in claim 1, further characterized in that: the sprocket-engaging portion of the device is in the form of a brake shoe, and the mounting portion and force receiving means are combined in a bracket rigid with the brake shoe and including means for affixation to the track frame part to move with the track frame part relative to the body part.

4. The invention defined in claim 3, further characterized in that: shim means is provided for cooperation with the bracket and track frame part to vary the mounting of the device on the track frame part.

5. For use in a tractor of the track-laying type having a longitudinal body part, a drive sprocket journaled at one side of the body part, a track frame part alongside the body part and ahead of the sprocket, an idler wheel spaced ahead of the sprocket and carried by the track frame part for rearward yielding relative to the track frame part and sprocket, an endless track chain trained about the sprocket and idler wheel, means mounting the track frame part on the body part providing for rearward shifting of the track frame part relative to the body part and sprocket in response to forces of predetermined magnitude, and a transverse bar member ahead of the sprocket wheel and connected to the track frame part for shifting therewith; a progress-impeding device having a drive-sprocket-engaging portion and a mounting portion, said mounting portion being formed to embrace the bar on the track frame part to position the device ahead of the drive sprocket with the sprocket-engaging portion normally spaced ahead of the sprocket; mounting means including an element complementary to the mounting portion for fixing the device to the bar so that the device is shiftable with the bar and track frame part relative to the body part to shift the sprocket-engaging portion of the device into engagement with the sprocket incident to a predetermined extent of rearward movement of the track frame part relative to the body part.

6. The invention defined in claim 5, further characterized in that: said device includes shim means cooperative with the bar and the device-mounting portion for varying the mounted position of the device relative to the track frame part and sprocket.

7. In a tractor of the track-laying type: a longitudinal body part; a drive sprocket journaled at one side at the rear end of the body; a track frame part alongside the body part and ahead of the sprocket; a front idler at the front end of the track frame part; an endless track chain trained about the idler and the sprocket; means mounting the idler on the track frame part for rearward movement relative to the track frame part and sprocket; means mounting the track frame part on the body for rearward shifting of the track frame part relative to the body part and sprocket incident to forces of a predetermined magnitude; a progress-impeding device having a drive-sprocket-engaging portion, and also having a mounting portion for mounting the device on one of the aforesaid parts for movement from a normal position free of the sprocket to a position in which said sprocket-engaging portion engages the sprocket; and means connected to the device for receiving force from the track frame part for moving the device to sprocket-engaging position incident to a predetermined extent of rearward movement of the track frame part relative to the body part.

8. In a tractor of the track-laying type: a longitudinal body part; a drive sprocket journaled at one side at the rear end of the body; a track frame part alongside the body part and ahead of the sprocket; a front idler at the front end of the track frame part; an endless track chain trained about the idler and the sprocket; means mounting the idler on the track frame part for rearward movement relative to the track frame part and sprocket; means mounting the track frame part on the body for rearward shifting of the track frame part relative to the body part and sprocket incident to forces of a predetermined magnitude, said last named means including a transverse bar fixed to the track frame part for shifting with the track frame part; a progress-impeding device having a drive-sprocket-engaging portion and a mounting portion, said mounting portion being formed to embrace the bar on the track frame part to position the device ahead of the drive sprocket with the sprocket-engaging portion normally spaced ahead of the sprocket; mounting means including an element complementary to the mounting portion for fixing the device to the bar so that the device is shiftable with the bar and track frame part relative to the body part to shift the sprocket-engaging portion of the device into engagement with the sprocket incident to a predetermined extent of rearward movement of the track frame part relative to the body part.

9. In a tractor of the track-laying type: a longitudinal body part; a drive sprocket journaled at one side of the rear end of the body; a track frame part alongside the body part and ahead of the sprocket; a front idler at the front end of the track frame part; an endless track chain trained about the idler and the sprocket; means mounting the idler on the track frame part for rearward movement relative to the track frame part and sprocket; means mounting the track frame part on the body for rearward shifting of the track frame part relative to the body part and sprocket incident to forces of a predetermined magnitude; and a brake-shoe fixed to the track frame part ahead of and in close proximity to the sprocket and shiftable rearwardly with the track frame to brake the sprocket.

10. In a tractor; a longitudinal body; front and rear spaced apart wheel means for carrying the body; means connecting the wheel means to the body in load-supporting relation to the body and providing for longitudinal movement of one wheel means relative to the body and relative to the other wheel means; means biasing the wheel means in spaced part relation in one longitudinal direction against movement in the opposite direction; brake means; means mounting the brake means on the tractor adjacent and for movement relative to an aforesaid wheel means between released and braking positions as respects said adjacent wheel means; and means connected to the brake means and to one of the wheel means providing for relative shifting between the brake means and one of the wheel means and operative incident to a predetermined extent of movement of one wheel means against the biasing means and relative to the other wheel means for moving the brake means to braking position.

11. In a vehicle: a longitudinal body; driving and supporting means for the body including a rotatable drive part and ground-engaging wheel means; means connecting the wheel means to the body for longitudinal movement relative to the body between a normal position and a shifted position; means normally biasing the wheel means to normal position; brake means; means mounting the brake means on the vehicle adjacent the rotatable drive part for movement from a normal position free of the rotatable drive part to a braking position engaging the rotatable drive part; and means connected to the brake means and to the wheel means for moving the brake means to braking position incident to a predetermined extent of movement of the wheel means against the biasing means and relative to the body.

12. In a tractor of the track-laying type: a longitudinal body; track means supporting the body and including front and rear rotatable members and an endless track chain trained about said members; means mounting said members for relative movement toward and away from each other; biasing means acting on one member and normally resisting movement thereof toward the other member; brake means; means mounting the brake means on the tractor adjacent and for movement relative to an aforesaid member for movement from a normal released position to a braking position engaging said adjacent member; and means operatively connecting the brake means and one of the members for movement relative to each for moving the brake means to braking position incident to a predetermined extent of movement of the members toward each other against the biasing means.

13. In a tractor of the track-laying type: a longitudinal body having a drive part; track means carrying the body and including an endless track chain and a rotatable chain-carrying member; yieldable chain-tensioning means associated with said member and normally biased to a predetermined load; brake means; means mounting the brake means on the tractor adjacent the drive part for movement from a normal position free of said part to a braking position engaging said part; and means connected to the brake means and having an operating connection to the chain-tensioning means for moving the brake means to braking position incident to overloading of said chain-tensioning means.

14. In a vehicle: a longitudinal body; a drive part carried by the body; load-encountering ground-engaging means; means connecting the ground-engaging means to the body for movement relative to the body between normal and overloaded positions; means acting between the body and the ground-engaging means for normally biasing the ground-engaging means to normal position; brake means; means mounting the brake means on the vehicle adjacent the drive part for movement from a normal position free of said part to a braking position engaging said part; and means connected to the brake means and having an operating connection to the ground-engaging means for moving the brake means to braking position incident to overloading of the ground-engaging means.

15. In a vehicle: a longitudinal body; a drive part carried by he body and having variable driving effectiveness; ground-engaging means adapted to encounter ground-borne, progress-restricting obstacles as the vehicle travels over the ground; means connecting the ground-engaging means to the body for movement of the ground-engaging means lengthwise of and relative to the body between a first position during which obstacles encountered are below a predetermined magnitude and a shifted position resulting from the encountering of obstacles above said predetermined magnitude; means acting between the body and the ground-engaging means for normally biasing the ground-engaging means to its first position; varying means for decreasing the effectiveness of the drive part; means mounting said varying means on the vehicle adjacent the drive part for movement from a normal position to a drive-part-affecting position; and means connected to the varying means and having an operating connection to the ground-engaging means for moving the varying means to drive-part-affecting position for decreasing the driving effectiveness of said part incident to shifting of the ground-engaging means to its second position.

16. For use in a tractor of the track-laying type having a longitudinal body part carried by track means including a track frame part, a track idler and drive mechanism and load-transmitting means carrying the body part on the track means and providing for fore-and-aft shifting of the idler and track frame part relative to the body part and drive mechanism in response to variations in load imposed on the idler and track part: a load-transmitting device in addition to the aforesaid load-transmitting means, said device having a mounting portion and a portion engageable in load-transmitting relation with the drive mechanism; means on the mounting portion for the mounting of the device on one of the aforesaid parts for movement from a first position free of engagement with the drive mechanism to a second position engaging the drive mechanism; and said device having means thereon for receiving force from the track frame part for moving the device to its second position in response to shifting of the track frame part caused by the imposition on the track means of a load beyond a predetermined magnitude, whereby the transmission of such load to the tractor is apportioned between the tractor load-transmitting means and the load-transmitting device.

JESSE G. LINDEMAN.

References Cited in the file of this patent

UNITED STATES PATENTS

| Number | Name | Date |
| --- | --- | --- |
| 619,284 | Devling | Feb. 14, 1899 |
| 1,122,797 | Osterhoudt | Dec. 29, 1914 |
| 1,206,953 | Wales | Dec. 5, 1916 |
| 2,083,907 | Harrigan | June 15, 1937 |